INVENTOR
Eugene N. Fox
ATTORNEYS

3,480,610
ALKALINE EXTRACTION OF M PROTEIN FROM GROUP A HEMOLYTIC STREPTOCOCCI AND PRODUCTS THEREOF
Eugene N. Fox, Chicago, Ill., assignor to the United States of America as represented by the Secretary of the Department of Health, Education and Welfare
Filed Mar. 20, 1967, Ser. No. 624,318
Int. Cl. C07g 7/00; A61k 23/00
U.S. Cl. 260—112                           13 Claims

ABSTRACT OF THE DISCLOSURE

Method of preparing a high molecular weight M protein by subjecting group A hemolytic streptococci cell walls to an alkaline extraction, and recovering the solubilized protein.

---

Figure 1:
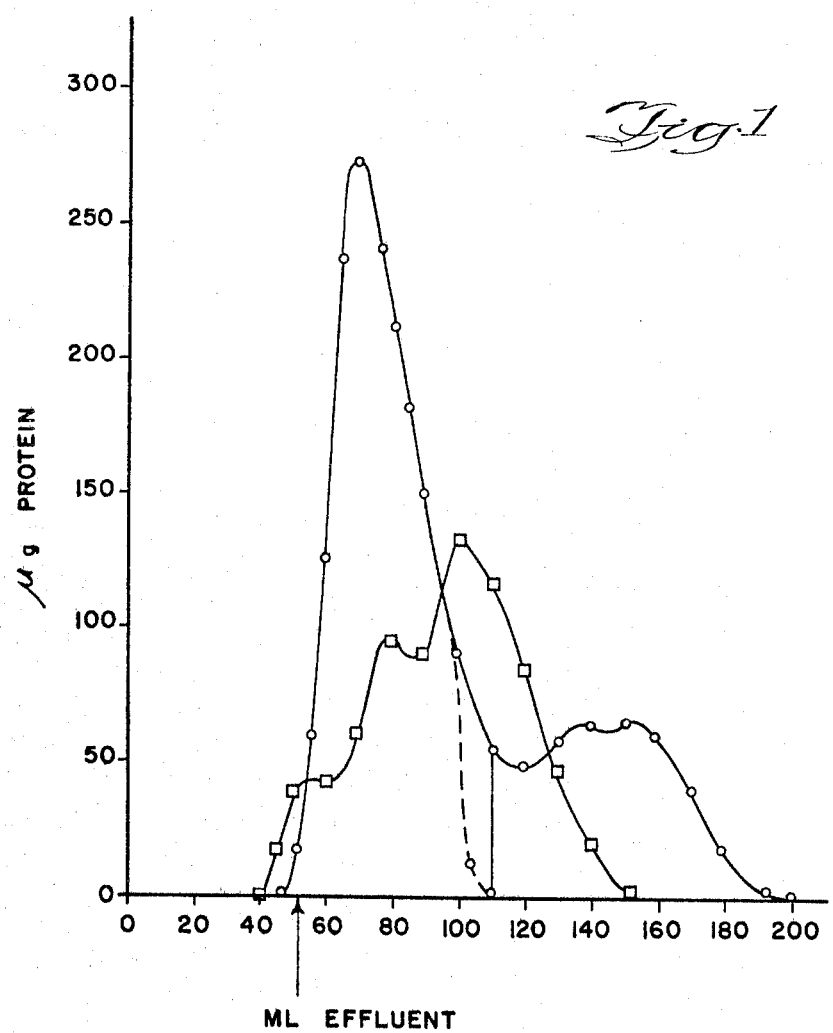

This invention relates to a new, high molecular weight form of M protein derived from group A hemolytic streptococci, and a method of deriving and purifying this new form of the M protein.

Although group A streptococci have been extensively studied, their antigens are still not fully understood. Most common infections which are caused by streptococci can be controlled through antibiotics but some of the complications caused by streptococcal infections such as rheumatic fever cannot always be prevented. The group A hemolytic streptococci are most closely associated with streptococcal infections in human beings and are responsible for side effects such as rheumatic fever and glomerulonephritis.

It has been well established that the M antigen, a protein associated with the group A streptococci, is chiefly responsible for the formation of protective antibodies in mammals. Consequently, it is generally agreed that a vaccine for the prevention of group A streptococcal infections must contain the M protein antigens in order to induce these specific protective antibodies.

Those streptococci usually responsible for human infections are designated as Lancefield group A, based on the serologically specific carbohydrate contained in the cell wall of the bacteria. It has been determined that immunity and protection are not related to this carbohydrate, but are based on a protein component, which has been designated the "M antigen." These M protein antigens determine the production of protective antibodies specific for each serological type. The group A streptococci have been classified into specific serological types based upon the M antigens found within this group A. It has been fairly well established that the M protein is the essential factor in the virulence of the group A streptococci. Other proteins, such as those which have been designated T antigens, for instance, are not related to virulence or immunity.

The extraction and purification of the M protein antigen from streptococcal cells has been attempted by many investigators and various schemes for purification of this protein have been proposed. These investigations were based on the finding that the M protein is bound to the cell wall. Extraction of the M protein antigen from the streptococcal cell has always presented a problem in that the microorganism contains many other antigens, most of which are toxic or capable of producing hypersensitivity in individuals exposed to these bacteria by way of clinical or subclinical infections. The presence of contaminating antigens in preparation of M proteins often induce toxic or allergic reactions in humans and experimental animals.

The most commonly used method for extracting the M protein from the cell walls is with hot dilute acid as described in Example 7. This technique is typically accomplished by suspending the cells in saline and adjusting the pH to 2.0 with hydrochloric acid. This suspension is stired in a water bath for about 10 minutes at 95° C., then cooled and neutralized with sodium hydroxide and then centrifuged.

Epidemiological evidence and laboratory experimentation over the past 20 years supports the conclusion that immunity to group A streptococcal infection is type specific. Antibodies directed against the M protein, the antigens responsible for the specificity of the 50 or more serotypes of group A streptococci, are protective by virtue of their opsonic capacity. Recent work has demonstrated that several small doses, for instance, 10 micrograms of highly purified, acid-extracted, M proteins induce type-specific bactericidal antibodies in rabbits (Fox and Wittner, J. Immunol., 97, 86, 1966). Using highly purified acid-extracted M protein of the types 12, 14, and 24, secondary bactericidal antibody responses have been induced in adults and primary immunization has been demonstrated in infants. (Fox et al., J. Exptl. Med., 124, 1135, 1966). The present invention includes a new and different method for extracting M proteins from streptococci cell walls by using different reagents, lower temperatures and longer extraction times than those used in the conventional acid-extraction technique. This invention produces a new type of pure M protein, which is more antigenically reactive than the acid-extracted M protein. It has been found that as little as 3 doses of one microgram of the alum-precipitated M protein of this invention will produce antibodies in rabbits comparable to antibodies induced by three 10-microgram doses of the acid-extracted M protein.

Generally, this invention consists of extracting a purifide suspension of streptococcal cell walls with an alkaline buffer system, having a pH in the vicinity of 10. The extraction is preferably carried out at approximately 37° C., and may conveniently be carried out in two steps or phases varying from 1 to 4 hours each. The solubilized M proteins are then neutralized and purified by salt fractionation and chromatography. Thus far, ammonium sulfate is the preferred salt for use in the salt fractionation. This salt-fractionated protein may be further purified by column chromatography using carboxymethyl cellulose and an elution gradient of buffers between pH 4.0 and 7.0. The product from the column chromatography may be further purified by the use of gel filtration wherein the gel is a polymerized dextran such as Sephadex or a polyacrylamide gel such as Bio-gel.

Figure 2:
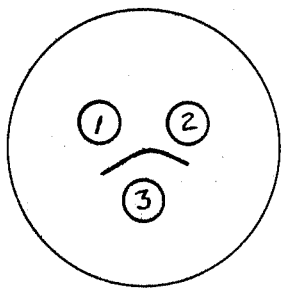

The differences between the product of this invention and the prior art are readily demonstrated by reference to the accompanying drawing, in which:

FIGURE 1 is an elution pattern based on the elution of type 12 M proteins from Sephadex G200. The data for the acid-extracted M protein, from the prior art, has been plotted using squares, while the data for the alkaline-extracted protein produced in accordance with this invention, has been plotted using circles; and FIGURE 2 is a sketch of an immunodiffusion agar plate (Ouchterlony technique). This plate was made up using purified type 12 M protein (acid extracted) from Example 7 in well 1; an equal concentration of purified type 12 M protein (alkaline extracted) from Example 1 in well 2; and unabsorbed type 12 antiserum in well 3. It can be seen that the antigen is homogeneous and the distance of diffusion of the M protein in well 2 is less than the M protein in well 1, indicating lower mobility and higher molecular weight for the M protein of Example 1. The same difference in molecular weight is shown by FIGURE 1 wherein the alkaline-extracted protein is eluted as a sharp spike close to the void volume (indicated by the arrow), indicating the alkaline-extracted material has a higher molecular weight and a narrow range of molecular weight distribution.

This invention contemplates the extraction of the streptococci cell walls with an alkaline media. Generally a pH of approximately 10 is preferred and has been shown to give good results. However, it is contemplated that pH values between 8 and 12 may be useful under some circumstances, but that the range of 8.5 to 11.0 is generally more suitable. The alkaline pH may be achieved by a variety of methods. Generally, it is important to use a buffer system in order to hold the pH within the desired range during the reaction which occurs during the extraction. The following alkaline buffers, when used at about pH 10.0, having given satisfactory results: Ammonium hydroxide, tris-(hydroxymethyl)-aminomethane or 2-amino-2-hydroxymethyl-1,3-propanediol (hereafter referred to as "tris"), hydrazine and hydroxylamine. It is contemplated that any of the standard biochemical buffer systems which are operable within the useful pH range may be used such as borate buffer, dibasic phosphate, pyrophosphate and others. The buffer concentration may be varied over wide ranges, and best concentration will depend upon the exact buffer system used and the pH at which the extraction takes place. The examples herein used 1 molar buffers for the extraction, but from about 0.5 to about 3 molar buffer concentrations are applicable.

It is preferred that the suspension be rapidly stirred during the extraction and that the formation of foam be avoided. If necessary, one or two drops of an antifoaming agent, such as octyl alcohol, may be added to the suspension.

The alkaline extractions of the cell walls, as shown in the following examples, have been double or two-step extractions carried out for total times running from 3 hours to 7 hours. Greater and lesser extraction times may be used, but generally extractions of a duration in the range of 1 to 4 hours, done in 1 or 2 steps are suitable. It has been found that a third extraction following two successive extractions seems to yield lower molecular weight M protein, with undesired contaminants.

All of the examples herein of the alkaline extractions employed 37° C. as the extraction temperature. Higher or lower temperatures may be used, but the higher temperatures, such as those approaching 100° C., tend to cause the M protein to break up and give a product of lower molecular weight. The extraction at temperatures in the vicinity of 0° C. may yield a suitable product, but the rate of extraction is too low and the duration is unduly extended. Generally, a temperature range of from about 25° C. to 65° C. is useful although other temperatures may be used. The extraction reaction can be virtually stopped by chilling the suspension to about 0° C.

The cell walls and other solid material may be separated from the solubilized protein conveniently by centrifugation. It has been found preferable to neutralize the suspension to a pH of 7.0 prior to the centrifugation. However, it is not necessary to neutralize the suspension prior to the centrifugation, since the subsequent dialysis has this effect.

Further purification of the M protein may be accomplished by salt fractionation using ammonium sulfate precipitation by column chromatography using carboxymethyl cellulose or carboxymethyl Sephadex and finally by gel filtration as illustrated in the following examples. The preferred medium for gel filtration is Sephadex G–200, a bacterial-modified dextran. Sephadex is produced from linear macromolecules of dextran which are cross-linked to produce a 3-dimensional network of polysaccharide chains. This material acts as a sieve for molecules of different sizes since the porosity of this gel is determined by the extent of cross-linkage. A high degree of cross-linkage creates a compact structure with low porosity, while a low cross-linkage produces a highly porous structure. The Sephadex G–200 is said to exclude molecules having a molecular weight of 200,000 or more.

It is essential to the successful practice of this invention that the alkaline extraction be conducted on streptococcal cell walls, and that they be essentially free of the cytoplasmic membrane and cytoplasm. The mechanism by which undegraded cell walls are separated from the balance of the streptococcal cells forms no part of this invention and may be accomplished by any suitable means. A suitable method for obtaining free cell walls is described below. The described method involves mechanical disintegration of the cells by milling or high-frequency shaking with glass beads. Suitable disintegration also can be accomplished by exposure to sonic waves or ultrasonic treatment.

PREPARATION OF STREPTOCOCCI CELL WALLS

Group A type 12 streptococci were harvested after growth for 18 hours in enriched Difco Todd-Hewitt broth supplemented with 10 grams of glucose, 8 grams of sodium bicarbonate, and one gram of sodium dibasic phosphate per liter of broth. The supplements were sterilized by filtration in 20% of the total volume of broth. A one-liter culture was used to inoculate 24 liters of broth, yielding 75 grams of cells, based on the wet weight, after 18 hours of growth. The packed cells were stored in 10-gram lots at −70° C.

A 130-gram sample (wet) of the thus prepared cells were washed and ruptured with glass beads in a Gifford-Wood Eppenbach Micro-Mill according to the method of Markowitz and Lange (J. Immunol., 92, 565, 1964). After removal of the glass beads with a coarse sintered glass funnel, the debris composed of cell walls and membranes was washed twice with 2-liter volumes of buffered saline by centrifugation at 9,000 times gravity for 30 minutes. All operations were carried out at 0° to 5° C. The cell walls containing the M protein were separated from the membrane by sedimenting the walls at 5,000 times gravity for 30 minutes in 2 liters of buffered saline. This step was repeated three times. After each washing the cell walls were evenly resuspended using a Waring Blendor with octyl alcohol added to prevent foaming. After the fourth washing, the supernatant liquid was clear and the yield of wet cell walls was approximately 75 grams.

A 20% suspension of cell walls containing crystalline ribonuclease at 10 micrograms per milliliter was incubated at 37° C. for 4 hours with occasional stirring. Two more washings with buffered saline were performed as described above.

The following procedure and examples illustrate the invention and set forth the best mode contemplated for carrying out said invention, but are not to be construed as limiting the invention.

Example 1

A suspension was made up from approximately 30 grams of wet ribonuclease-treated group A hemolytic streptococcal cell walls, prepared as described above, and sufficient saline to make 120 milliliters of suspension. The suspension was brought to pH 10.0 by the addition of 2 molar "tris" buffer to a final concentration of 1 molar and adjustment of the pH was made with hydrochloric acid. The suspension was incubated at 37° C. for 2 hours with rapid stirring and then cooled. The supernatant liquid (containing about 55% of the total M antigen recovered) was removed after centrifugation at 10,000 times gravity for 30 minutes. This first extraction yielded 91 milligrams of the solubilized crude M protein, as determined by the method of Lowry et al. (J. Biol. Chem., 193, 265, 1951). The remaining cell walls were resuspended and extracted a second time in the same manner. The supernatant liquid from the second extraction, which contained about 70 milligrams of the crude M antigen, was combined with the supernatant liquid from the first extraction, and the volume was decreased from 326 milliliters to about 80 milliliters by lyophilization and dialysis against buffered saline. The addition of 33% of saturation of ammonium sulfate at 0° C. caused no precipitate, but the further addition of sufficient ammonium sulfate to give 60% of saturation at 0° C. caused a substantial precipitate. After 2 hours, recovery of the precipitate by centrifugation yielded 25.2 milligram of protein.

Final purification was attained by column chromatography. A column of carboxymethyl cellulose, 0.6 milliequivalent per gram, 2.6 centimeters by 41 centimeters, was packed to a constant volume and equilibrated with 0.03 molar sodium acetate, pH 4.0. This column could accommodate up to 150 milligrams of crude protein. The M protein (25.2 milligrams) in 10 milliliters of buffered saline was applied to the column and elution was begun with 0.1 molar sodium acetate at pH 5.5. The first series of fractions emerging before pH 5.0 consisted of small amounts of residual nucleic acid, group-specific polysaccharide and traces of non-specific protein. After this elution the buffer was changed to 0.1 molar potassium phosphate pH 7.0. As the pH of the effluent reached 6.0, a symmetrical peak consisting of the pure M protein emerged and was completely eluted at pH 6.2. This fraction was concentrate by lyophilization and dialyzed against buffered saline. The yield from this procedure was approximately 7.0 milligrams.

Using the method of Boas (J. Biol. Chem. 204, 553, 1953) less than 0.5% hexosamine was found and less than 0.8% methylpentose was found using the method of Dische and Shettles (J. Biol. Chem. 175, 595, 1948) The ultraviolet extinction coefficient ratio of 280 millimicrons to 260 millimicrons was 1.18. Immunodiffusion tests using agar plates (as depicted in FIGURE 2) showed a single distinct line for this purified M protein when reacted with unabsorbed type 12 antiserum as described by Fox and Wittner (Proc. Nat. Acad. Sci., 54, 1118, 1965).

Example 2

Twenty-five grams of type 12 group A hemolytic streptococcal cell walls were suspended to a volume of 100 milliliters in saline and treated with ribonuclease as described above. The suspension was adjusted to pH 10.0 by the addition of an equal volume of two molar "tris." The suspension was incubated at 37° C. for one and one half hours with rapid stirring and then cooled. During the extraction, the pH was adjusted to 10.0 as necessary. The supernatant liquid (containing about 65% of the total M antigen recovered) was removed after centrifugation at 10,000 times gravity for 30 minutes. This first extraction yielded 71.4 milligrams of the solubilized crude M protein. The remaining cell walls were resuspended and extracted a second time in the same manner. The supernatant liquids from the second extraction contained about 35.7 milligrams of the crude M antigen.

Each extract (supernatant liquid) was separately dialyzed against 0.01 phosphate buffer at a pH of 7.0 for 24 hours. The extracts were then lyophilyzed to decrease their volume, and then dialyzed against saline over night. The extracts were clarified by centrifugation before the salt fractionation. The addition of 33% of saturation of ammonium sulfate at 0° C. caused no precipitate in either extract, but the further addition of sufficient ammonium sulfate to give 60% of saturation at 0° caused a substantial precipitate in both extracts. After 2 hours the precipitated proteins were recovered by centrifugation. The first extraction gave 19.8 milligrams of protein and the second extract gave 9.6 milligrams of protein.

Final purification was attained by column chromatography. A column of carboxymethyl cellulose, 0.6 milliequivalents per gram, 2.6 centimeters by 37 centimeters, was packed to a constant volume and equilibrated with 0.03 molar sodium acetate, pH 4.0. The M protein (29.4 milligrams) in 10 milliliters of buffered saline was applied to the column and elution was begun with 0.1 molar sodium acetate at pH 5.5. The first peak emerging at about pH 5.0 consisted of small amounts of residual nucleic acid, group-specific polysaccharide and extraneous protein. When the effluent reached pH 5.5, a linear gradient of 0.1 M potassium phosphate buffer of increasing pH was applied to the column by adding equal volumes of buffers at pH 6.0, 6.5 and 7.0 to a Technicon "Autograd" mixing chamber for the final elution. Minor fractions of nonspecific protein emerged prior and subsequent to the elution of the main peak of M protein near pH 6.0. The pure M protein was completely eluted at pH 6.4. This fraction was concentrated by lyophilization and dialyzed against buffered saline. The yield from this procedure was approximately 3.7 milligrams of pure high molecular weight M protein. No extraneous antigens were detected in immunodiffusion analyses as described in Example 1.

Example 3

A 25% suspension was made up from approximately 46 grams of wet ribonuclease-treated type 12 group A hemolytic streptococcal cell walls in saline prepared as described above. The suspension was adjusted to pH 10.0 by the addition of an equal volume of 2.0 molar ammonium hydroxide adjusted to that pH with hydrochloric acid. The suspension was incubated at 37° C. for one and one half hours with rapid stirring and then cooled. The supernatant liquid (contining about 71% of the total M antigen) was removed after centrifugation at 10,000 times gravity for 30 minutes. This first extraction yielded 73 milligrams of the solubilized crude M protein. The remaining cell walls were resuspended and extracted a second time in the same manner. The supernatant liquid from the second extraction, containing about 29 milligrams of the crude M antigen, was combined with the supernatant liquid from the first extraction, and the volume was decreased by lyophilization and dialysis against buffered saline. The addition of 33% of saturation of ammonium sulfate at 0° C. caused no precipitate, but the further addition of sufficient ammonium sulfate to give 60% of saturation at 0° C. caused a substantial precipitate. After 2 hours, centrifugation gave 63.2 milligrams of protein. Further additions of ammonium sulfate to 75% of saturation yielded no additional M protein.

Final purification was attained by column chromatography. A column of carboxymethyl cellulose, 0.6 milliequivalent per gram, 2.6 x 41 centimeters, was packed to a constant volume and equilibrated with 0.03 molar sodium acetate, pH 4.0. The M protein (25.2 milligrams) in 10 milliliters of buffered saline was applied to the column and elution was begun with 0.1 M sodium acetate at pH 5.5. The first peak, emerging at about pH 5.0 consisted of small amounts of residual nucleic acid and group-specific polysaccharide. After the elution of this peak, the buffer was changed to 0.1 M potassium phosphate, pH 7.0. As the pH of the effluent reached 6.5, a symmetrical peak consisting of the pure M protein emerged and was completely eluted at pH 6.9. This fraction was concentrated by lyophilization and dialyzed against buffered saline. The yield from this procedure was approximately 16.4 milligrams.

Analyses of this preparation of M protein showed less than 0.2% hexosamine. Immunodiffusion tests showed a single distinct line for this M protein, indicating that an immunologically pure protein fraction had been recovered.

Example 4

A 25% suspension was made from approximately 45 grams of wet ribonuclease-treated type 12 group A hemolytic streptococcal cell walls in 150 milliliters of saline, as described above. The suspension was adjusted to pH 10.0 by the addition of an equal volume of freshly made 2 molar hydroxylamine. The suspension was incubated at 37° C. for 3 hours with rapid stirring and then cooled. The supernatant liquid (containing about 51% of the total M antigen) was removed after centrifugation at 10,000 times gravity for 30 minutes. This first extraction yielded 118 milligrams of the solubilized crude M protein. The remaining cell walls were resuspended and extracted a second time in the same manner, but for 4 hours. The supernatant liquid from the second extraction, which contained about 114 milligrams of the crude M antigen, was combined with the supernatant liquid from the first extraction. The volume was decreased by lyophilization and excess salt was removed by dialysis against buffered saline. The addition of 33% of saturation of ammonium sulfate at 0° C. caused no precipitate, but the further addition of sufficient ammonium sulfate to give 60% of saturation at 0° C. caused a substantial precipitate. After 2 hours, the protein was recovered by centrifugation and was then dialyzed against buffered saline at pH 7.0.

Final purification was attained by column chromatography. A column of carboxymethyl cellulose, 0.6 milliequivalents per gram, 2.6 by 41 centimeters, was packed to a constant volume and equilibrated with 0.03 molar sodium acetate, pH 4.0. The M protein (105 milligrams) in 10 milliliters of buffered saline was applied to the column and elution was begun with 0.1 M sodium acetate at pH 5.5. The first peak emerging near pH 4.6 consisted of small amounts of residual nucleic acid and group-specific polysaccharide. As the effluent approached pH 5.2, a second fraction emerged containing some of the M protein and protein of nonspecific antigencity. After the elution of this peak, the buffer was changed to 0.1 M potassium phosphate, pH 7.0. As the effluent reached pH 5.8, a symmetrical peak consisting of the pure M protein emerged, and was completely eluted at pH 6.5. This fraction was concentrated by lyophilization and dialyzed against buffered saline. The yield from this procedure was approximately 26 milligrams.

Analyses of this protein showed less than 0.2% of hexosamine and less than 0.9% methylpentose. The ratio of the ultraviolet extinction coefficients at 280 millimicrons to 260 millimicrons was 1.22.

Sedimentation analysis in the Model E Spinco ultracentrifuge gave an S value for this protein of 2.81. Viscosity measurements showed an intrinsic viscosity value of 0.44 deciliter per gram. For an estimation of the molecular weight of this M protein a partial specific volume of 0.74 was assumed for a prolate ellipsoid, corresponding to an axial ratio of 26:1 (Cohn and Edsall, Proteins, Amino Acids and Peptides as Ions and Dipolar Ions; Reinhold Publ. Co., New York, 1943, p. 519). These data were applied to the formula of Scheraga and Mandelkern (J. Am. Chem. Soc., 75, 179, 1953) and an average molecular weight of 80,000 was calculated. This value is approximately double that of the M protein obtained by acid extraction according to Example 7.

The alkaline-extracted pure M protein (10 mg.) obtained as described in Example 4 was applied to a column of Sephadex G–200. The elution pattern is shown in FIGURE 1 and is superimposed on the elution pattern obtained with a 10-mg. sample of M protein extracted from cell walls by hot acid treatment as described in Example 7. It may be seen that the bulk of the alkaline-extracted M protein eluted (in buffered saline) close to the "void volume" of the column, indicating that this main fraction was a protein of higher average molecular weight than the acid-extracted M protein. The trailing portion of the alkaline M protein was contaminated with a nonspecific antigen and therefore, protein eluting after 110 milliliters of effluent buffer had passed through the column and was discarded. A rechromatograph of the alkaline-extracted M protein showed an elution pattern identical to the first pattern, except the dotted portion of the curve was followed at 100 milliliters.

Example 5

Following the procedures of Example 4, a suspension of 98 grams of wet cell walls in hydroxylamine was extracted for one and one half hours, twice as in Example 4 to yield a total of 384 milligrams of crude M protein. The remaining cell walls were extracted a third time, using the same concentrations and reagents, to yield 148 milligrams of crude M protein. Still following the procedure of Example 4, the crude M protein was salt fractionated to yield 173 milligrams from the first two extractions and 56 milligrams from the third extraction.

Example 5A

The protein from the first two extractions was divided and subjected to column chromotography. One portion, of 83 milligrams, was subjected to the elution procedure described in Example 2, which gave a main peak of 13.3 milligrams at about pH 6.5. This fraction, when subjected to immunodiffusion tests on agar, showed the presence of some of a second non-specific immunological component. To separate these components, the M protein was further fractionated using gel chromatography (Sephadex G–200). This yielded 4.4 milligrams of serologically pure M protein.

Example 5B

A portion (83 milligrams) of the protein from the first two extractions was subjected to column chromatography similar to that used in the foregoing examples, but the elutions were performed by using gradient buffers. The carboxymethyl cellulose column was equilibrated by 0.03 molar sodium acetate at pH 4.0. A gradient elution was carried out by using 300 milliliters of 0.1 molar sodium acetate buffer at pH 4.5, 300 milliliters of 0.1 molar sodium acetate buffer at pH 5.0, and 300 milliliters of 0.1 molar sodium acetate buffer at pH 5.5 in a gradient elution chamber. This procedure yielded some protein which was not serologically active. The second elution was started with 300 milliliters 0.1 of molar phosphate buffer at pH 6.0 plus 300 milliliters of 0.1 molar phosphate buffer at pH 6.5, plus 300 milliliters of 0.1 molar phosphate buffer at pH 7.0, in the gradient mixing chamber. This gave 32 milligrams of M protein. Immunodiffusion on agar showed the presence of two immunological components. Therefore, the fractionated protein was subjected to gel chromatography on Sephadex G–200. This yielded a main fraction of 13.5 milligrams of serologically pure high molecular weight M protein.

Example 5C

The third extract was likewise subjected to carboxymethyl cellulose column chromatography followed by gel column chromatography. The elution diagram showed the third extraction had solubilized a high percentage of extraneous components from the stroptococcal cell walls.

Example 6

Following the procedure of Example 2, a 25% suspension of 23 grams of wet cell walls was prepared and extracted twice with equal volumes of 2 molar hydrazine hydrate ($NH_2NH_2 \cdot H_2O$) at pH 10. Salt fractionation of the extracts, using ammonium sulfate, yielded 97 milligrams of crude M protein. Of this, 95 milligrams was subjected to column chromatography using the method of Example 2. This yielded 20.0 milligrams of immunologically impure M protein (as shown by an immunodiffusion test with agar). Purification of this by gel chromatography (Sephadex G–200) yielded 7.1 milligrams of immunologically pure high molecular weight M protein.

Example 7

To a 25% suspension of cell walls in buffered saline, one molar hydrochloric acid was added to bring the pH to 2.0. The mixture was then heated in a water bath at 95° C. for 10 minutes. This suspension was then cooled and neutralized with 1 molar sodium hydroxide and the supernatant liquid (containing about 65% of the total M antigen) was removed after centrifugation at 10,000 times gravity for 30 minutes. The cell walls were extracted a second time in the same manner and the neutralized supernatant liquid containing the crude M proteins were combined.

By adding ammonium sulfate to a 33% of saturation at 0° C., a slight precipitate was formed which was removed by centrifugation. The solution was brought to 60% saturation with respect to ammonium sulfate, and after 2 hours the precipitated crude M protein was removed by centrifugation, dissolved in 10 milliliters of water, and dialyzed over night at 5° C. against buffered saline. The yield at this point was approximately 123 milligrams. This procedure is essentially that of Lancefield & Perlmann (J. Exptl. Med., 96, 71, 1952) except that whole cells rather than cell walls were used in the latter case.

The final purification for the acid-extracted M protein was achieved by column chromatography. A column of carboxymethyl cellulose 0.6 meq. per gram was packed to constant volume in a column 2.4 by 35 centimeters and equilibrated with 0.03 molar acetate pH at 4.0. This column could accommodate up to 150 milligrams of crude protein. The 123 milligrams of the M protein obtained above in 10 milliliters of buffered saline was applied to the column and elution was begun with 0.1 molar sodium acetate at pH 5.5. The first peak emerging consisted of small amounts of residual nucleic acid and group-specific polysaccharide. As the effluent approached pH 5.5, a second fraction emerged containing some of the M protein and proteins of non-specific antigenicity. After the elution of this peak the buffer was changed to 0.1 M potassium phosphate at pH 7. As the effluent reached pH 6.5, a third symmetrical peak consisting of the pure M protein emerged and was completely eluted at pH 7.0. This fraction was concentrated by lyophilization and dialyzed against buffered saline. The yield from this procedure was approximately 60 milligrams.

The exact manner by which the high molecular weight alkaline-extracted M protein is formulated into vaccines forms no part of this invention. The many forms of pharmaceutical carriers or adjuvants known to those skilled in the art, may be used in connection with the M protein of this invention. A suitable method for preparing an alum precipitated vaccine of alkaline-extracted M protein is described below:

To 16 milliliters of M protein from Example 4 solution in 0.85% sodium chloride (in the absence of phosphate) was added 6 milliliters of 0.2 molar aluminum potassium sulfate. The solution was adjusted to pH 6.0 with 1 molar sodium hydroxide added dropwise with rapid stirring. The pH was monitored with microelectrodes sterilized with 70% ethanol. As the pH reached 6.0, 3.0 milliliters of 0.1 molar sodium acetate, pH 7.0 was added and the solution was adjusted to pH 7.0 with several more drops of sodium hydroxide. The precipitated aluminum hydroxide was incubated in the solution at 37° C. with occasional stirring for one hour and then chilled to 0° C. for one hour. The aluminum hydroxide was then collected by centrifugation and washed twice with 20 milliliters volumes of cold sterile Ringer's lactate buffer and finally suspended in the latter buffer (containing 0.01% sodium ethylmercurithiosalicylate as a preservative). Three milligrams of aluminum hydroxide could absorb up to 300 micrograms of M protein.

The purified type 12 M protein, as extracted from the cell walls in accordance with the procedure of Example 4 above, was compared with the acid-extracted M protein as prepared in accordance with Example 7, through serological testing in a passive hemagglutination assay using tanned sheep erythrocytes (Fox, J. Immunol., 93, 826, 1964). This test demonstrates the ability of specific antisera to agglutinate red blood cells that have been coated with homologous antigen. The data obtained from this test shows that on an equal weight basis, the type 12 M protein obtained by extraction of the cell walls with hydroxylamine (Example 4) has a greater capacity to coat the red cells or senitize the tanned sheep erythrocytes than does the acid-extracted M protein (Example 7).

These same purified M proteins were again compared in a hemagglutination inhibition test. (Fox et al., J. Exptl. Med., 124, 1135, 1966). Generally, this test is performed by taking standard aliquots of antiserum and incubating them with samples of M protein. The sera are then assayed in the agglutination test. The reaction between pure soluble M protein and antiserum is reflected in a diminution of the agglutination titer. This test revealed that at a concentration of 1.25 micrograms of M protein per milliliter of approximately diluted serum, the alkaline-extracted M protein (prepared as described in Example 4) is four times more active than the acid-extracted M protein (as prepared in accordance with Example 7) in removing specific antibodies from the serum sample.

A rabbit was immunized with type 12 heat-killed whole streptococcal cells. The serum from the immunized rabbit was used to compare the antigenic reactivity of the alkaline-extracted M protein as prepared by Example 4 with the acid-extracted protein, as prepared by Example 7. The sera were assayed using a passive hemagglutination test. This showed that the erythrocytes coated with the high molecular weight alkaline-extracted M protein are capable of reacting with over 100 times more antibodies than the erythrocytes coated with the low molecular weight acid-extracted protein. In other words, the high molecular weight protein "recognizes" many more specific antibodies to the protein than does the low molecular weight M protein. This shows that the high molecular weight alkaline-extracted M protein induces more antibodies, presumably owing to the presence of additional antigenic sites not found on the acid-extracted M protein, and therefore the alkaline-extracted M protein may be more effective as an immunizing agent.

Further testing showed that rabbits immunized with 3 doses of 10 milligrams of alum-precipitated M protein (alkaline extracted using hydroxylamine as in Example 4 and 5B) achieved good antibody levels. The sera of such rabbits were assayed using sensitized erythrocytes and both alkaline-extracted type 12 M proteins and acid-extracted M protein. This assay showed that the antibodies were significantly higher using the high molecular weight alkaline-extracted M protein.

Another group of rabbits was immunized with low molecular weight M protein in the same manner as the alkaline-extracted M protein immunized rabbits, described above, but the antibody titers were lower regardless of whether the sera were assayed with the high or the low molecular weight M protein.

This invention also contemplates the use of the alkaline treatment to obtain further purification and fractionation if impure M protein which has been obtained by methods other than the alkaline extraction of cell walls, such as by enzymatically removing the M protein from cell walls through the use of lytic enzymes. Such enzymatic procedures may give an M protein which is in a desirable molecular weight range, but which is contaminated. The alkaline extraction and associated refining techniques of this invention may be used to purify such contaminated protein.

Although all of the foregoing examples were concerned with the type 12 serotype of group A hemolytic streptococci, this invention contemplates the use of other serotypes of group A hemolytic streptococci as well.

This invention is not limited to or by the details and examples given above to illustrate and explain the invention. Numerous changes and modifications may be made without departing from the spirit of the invention as expressed in the appended claims.

I claim:

1. A high molecular weight M protein obtained by alkaline extraction at a pH of about 8.5 to 11 group A hemolytic streptococci cell walls, wherein said protein has a molecular weight in excess of about 70,000.

2. A method of preparing a high molecular weight M protein which comprises subjecting group A hemolytic streptococci cell walls to an alkaline extraction at a pH of about 8.5 to 11, and recovering the solubilized protein.

3. A method as described in claim 2 wherein the alkaline extraction is carried out at from about 25° C. to about 65° C.

4. A method as described in claim 2 wherein the alkaline extraction duration is from about 1 hour to about 4 hours.

5. A method as described in claim 2 wherein the extraction is carried out in two steps, the cell walls remaining after the initial extraction being resuspended and subjected to a second alkaline extraction at a pH of from about 8.5 to 11.

6. A method as described in claim 2 wherein the alkaline extraction is carried out using a buffer selected from the group consisting of tris-(hydroxymethyl)-aminomethane, 2-amino-2-hydroxymethyl-1,3-propanediol, ammonium hydroxide, hydroxylamine, and hydrazine.

7. A method of preparing a high molecular weight M protein as described in claim 2 which comprises subjecting the cell walls to a two-step extraction using a buffer system selected from the group of tris-(hydroxymethyl)-aminomethane, 2-amino-2-hydroxymethyl-1,3-propanediol, ammonium hydroxide, hydroxylamine, and hydrazine, at about pH 10.0 at a temperature of about 37° C. for a total time of from about 1 hour to about 4 hours, the cell walls remaining after the initial extraction being resuspended and subjected to a second alkaline extraction at a pH of about 10.

8. A method as described in claim 7 wherein the solubilized M protein is purified by salt fractionation, column chromatography, gel filtration chromatography or combinations thereof.

9. A method of preparing high molecular weight M protein which comprises subjecting group A hemolytic streptococci cell walls to an extraction in the presence of an alkaline buffer system of from about pH 8.5 to about pH 11.0 at a temperature of from about 25° C. to about 65° C. for from about 1 to about 4 hours, in order to solubilize the M protein; precipitating the solubilized protein using salt fractionation; purifying the precipitated M protein using column chromatography.

10. A method as described in claim 9 wherein the alkaline buffer is selected from the group consisting of tris-(hydroxymethyl)-aminomethane, 2-amino - 2 - hydroxymethyl-1,3-propanediol, ammonium hydroxide, hydroxylamine, and hydrazine.

11. A method as described in claim 9 wherein the extraction is carried out in two steps, the cell walls remaining after the initial extraction being resuspended and subjected to a second alkaline extraction at a pH of from about 8.5 to 11.

12. A method as described in claim 10, which includes a further purification step of gel filtration.

13. A method of removing contaminants from M protein which comprises subjecting impure M protein derived from group A hemolytic streptococci to alkaline extraction at a pH of from about 8.5 to 11 to solubilize the M protein, and then recovering the M protein.

References Cited

UNITED STATES PATENTS

| | | | |
|---|---|---|---|
| 2,741,653 | 4/1956 | Kutsky | 260—112 |
| 2,960,437 | 11/1960 | Friedman et al. | 260—112 X |
| 3,070,505 | 12/1962 | Fantes et al. | 424—123 |
| 3,121,714 | 2/1964 | Gollaher et al. | 260—210 |
| 3,155,578 | 11/1964 | Gaeumann et al. | 424—123 X |

OTHER REFERENCES

Fox et al.: J. of Bacteriology, 1956, vol. 71, pp. 454–460.

Brock: J. of Bacteriology, 1963, vol. 85, pp. 527–531.

Fox: J. of Biological Chemistry, 1961, vol. 236.

Fox et al.: Chem. Abstracts, vol. 64, 1966, p. 5613.

WILLIAM H. SHORT, Primary Examiner

HOWARD D. SCHAIN, Assistant Examiner

U.S. Cl. X.R.

424—92, 123, 177